June 18, 1940.    A. G. H. CARLBOM    2,204,925
VARIABLE LEVERAGE GEAR FOR BRAKES
Filed March 31, 1939    4 Sheets-Sheet 1
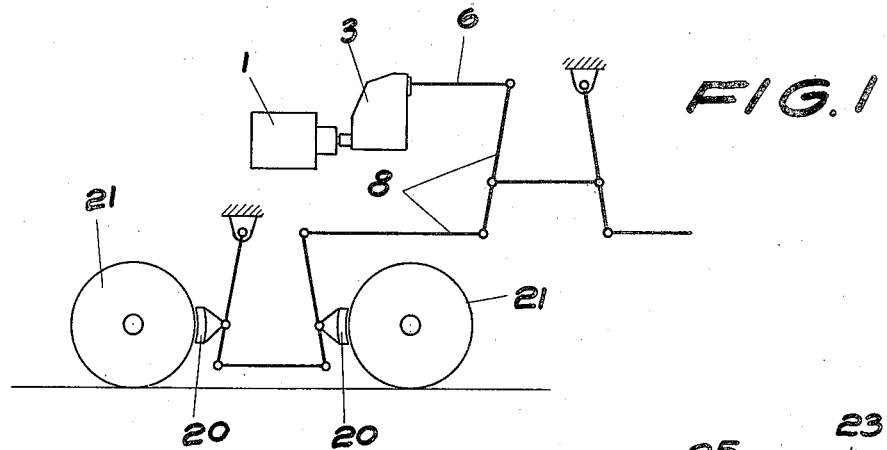
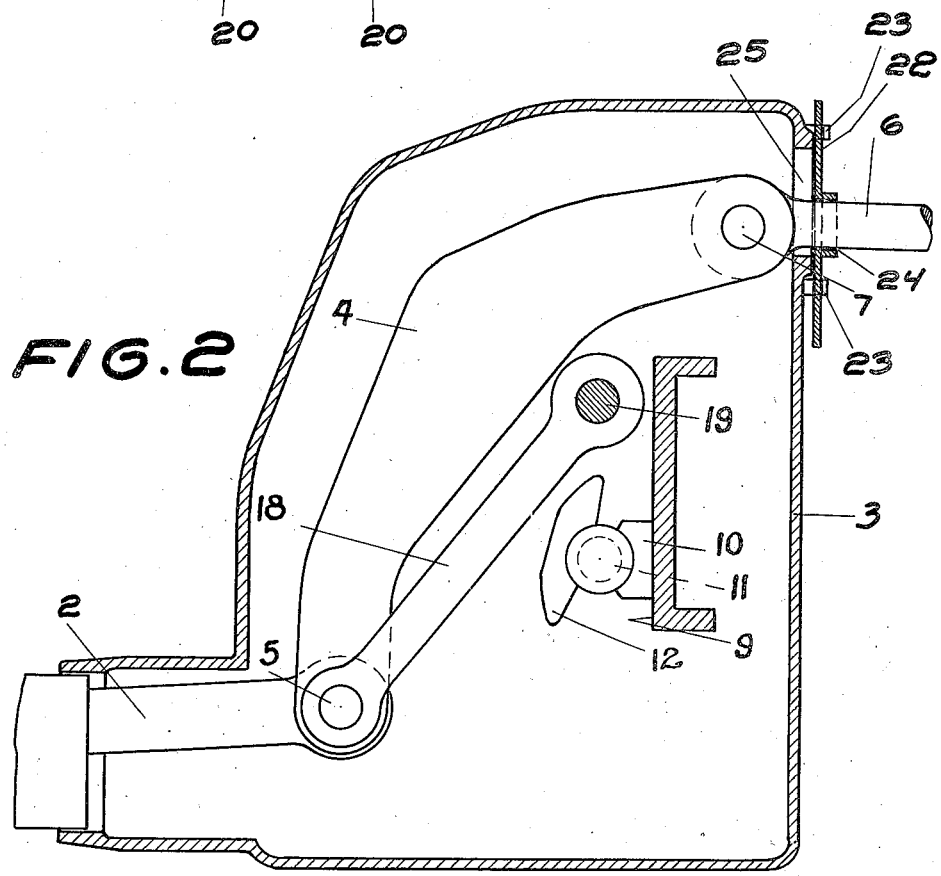

June 18, 1940. A. G. H. CARLBOM 2,204,925
VARIABLE LEVERAGE GEAR FOR BRAKES
Filed March 31, 1939 4 Sheets-Sheet 2

Inventor:
A. G. H. Carlbom
By E. F. Wimworth
Atty

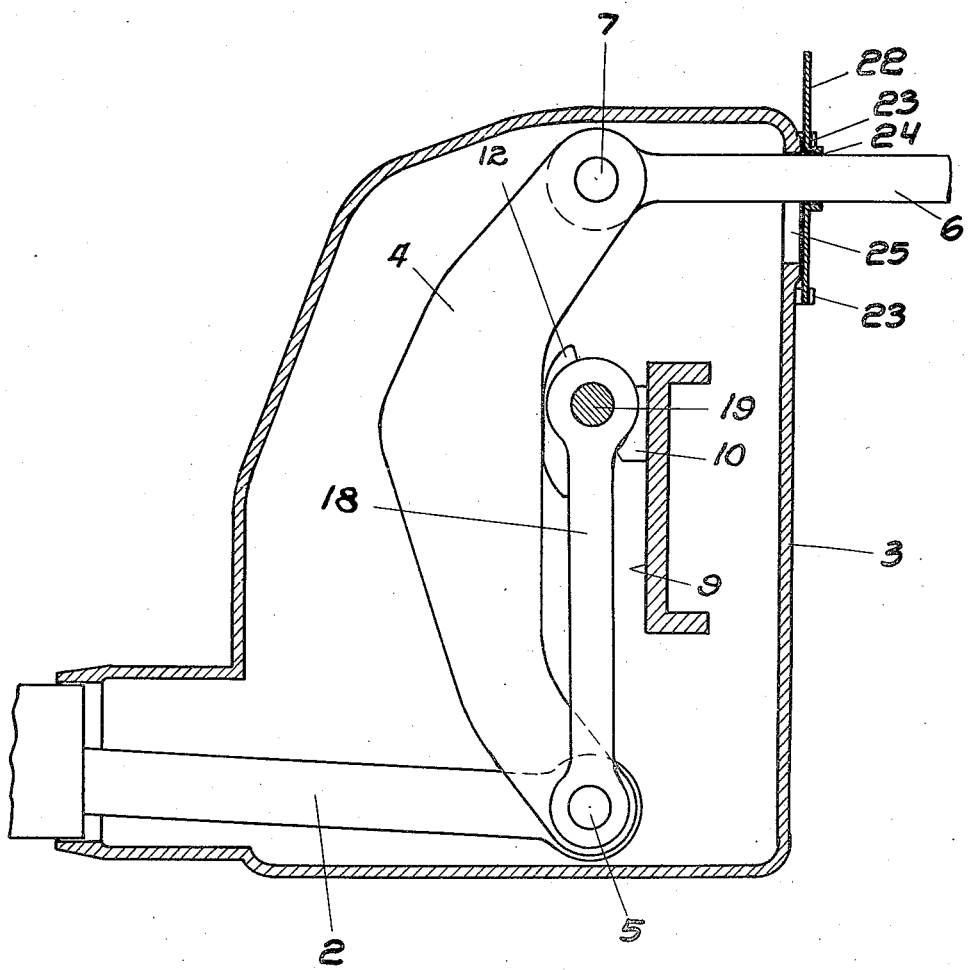

UNITED STATES PATENT OFFICE 2,204,925

VARIABLE LEVERAGE GEAR FOR BRAKES

Axel Georg Hjalmar Carlbom, Malmo, Sweden, assignor to Svenska Aktiebolaget Bromsregulator, Malmo, Sweden, a corporation of Sweden Application March 31, 1939, Serial No. 265,355
In Germany April 7, 1938

6 Claims. (Cl. 74—518)

This invention relates to a variable leverage gear for brakes, especially railway vehicle brakes, of the kind comprising a lever for connecting the brake rigging to the brake actuator, and an adjustable fulcrum support for said lever for varying the leverage ratio thereof according to the load on the vehicle.

One object of the invention is to construct the variable leverage gear as a unit capable of being mounted in most types of railway vehicle brakes without much changes in the usual brake construction.

Another object of the invention is to construct the variable leverage gear as a unit of relatively small dimensions.

A further object of the invention is to construct the variable leverage gear as a unit comprising a gear case completely enclosing the variable leverage lever and the adjustable fulcrum support therefor.

With this and other objects in view, which will become apparent as the description of the invention proceeds, the invention consists in the features, combinations of features and details of construction hereinafter described and claimed.

For a full understanding of the invention reference is to be had to the accompanying drawings which illustrate an embodiment of the invention and in which:

Fig. 1 is a diagrammatic view of a vehicle brake arrangement in which the variable leverage gear of the invention is incorporated, the brake cylinder, the variable leverage gear case and adjoining parts of the brake rigging being shown in the plane, and the wheels of the vehicle, the brake shoes and adjoining parts of the brake rigging being shown in elevation.

Figs. 2 and 3 are two horizontal sections of the gear case with the variable leverage lever in positions corresponding to released and applied brake, respectively.

Figs. 4 and 5 are two sections similar to those of Figs. 2 and 3, respectively, but with the displaceable fulcrum support for the variable leverage lever in another position.

Figure 3:
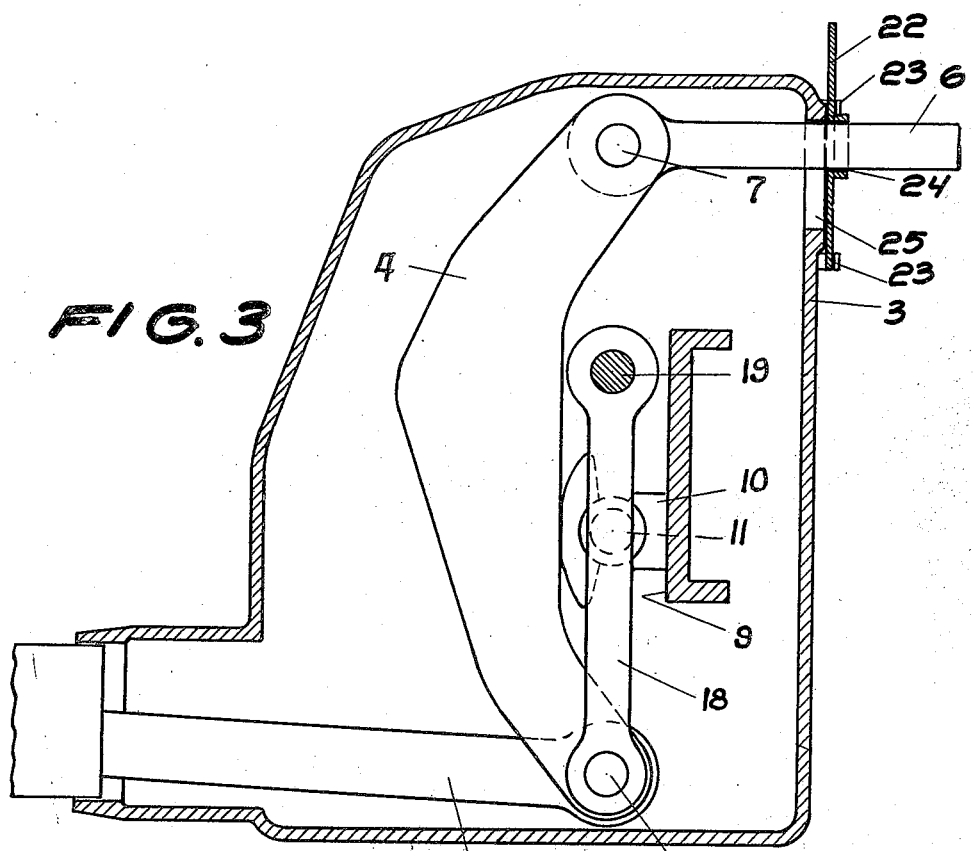
Figure 6:
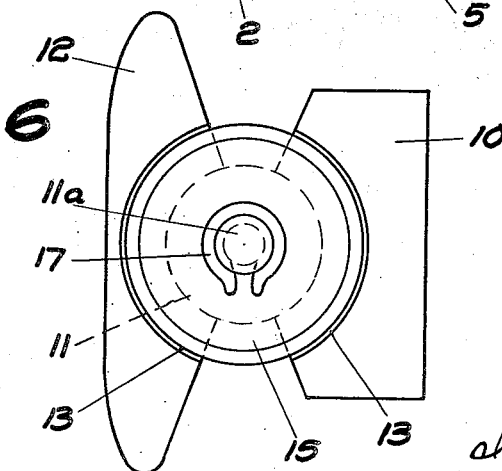
Figs. 6 and 7 are a detail plan view and horizontal section, respectively, of the displaceable fulcrum support for the variable leverage lever.
Figure 4:
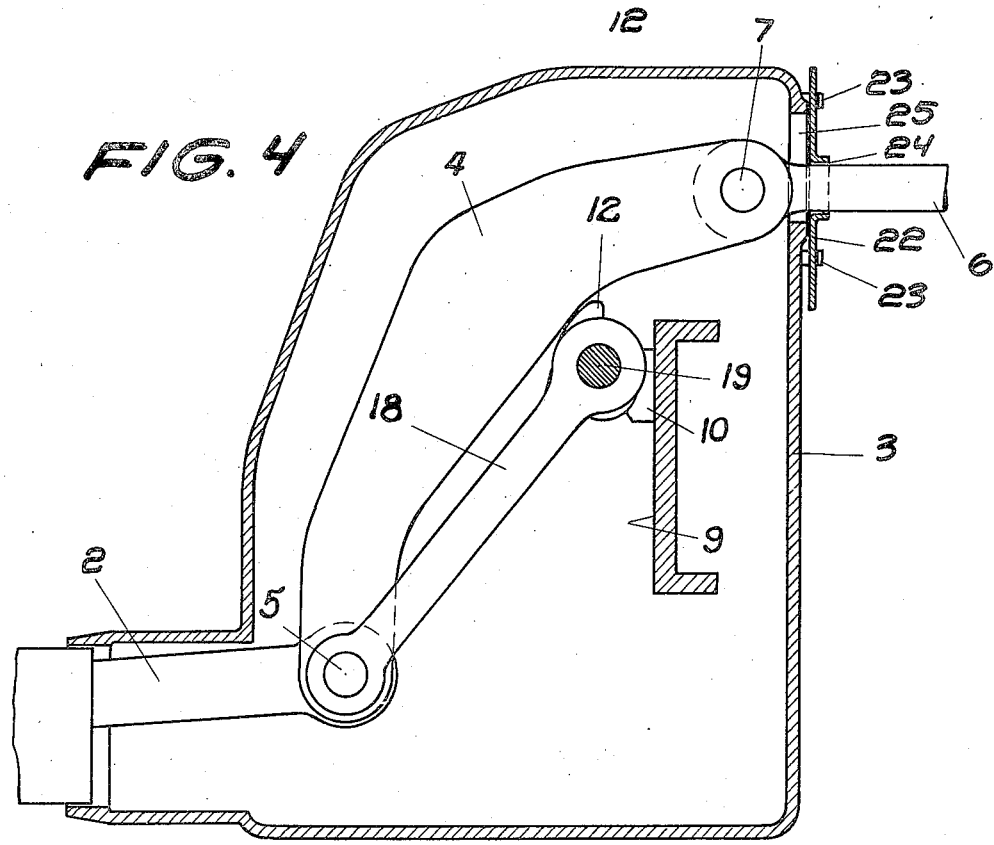
Figure 7:
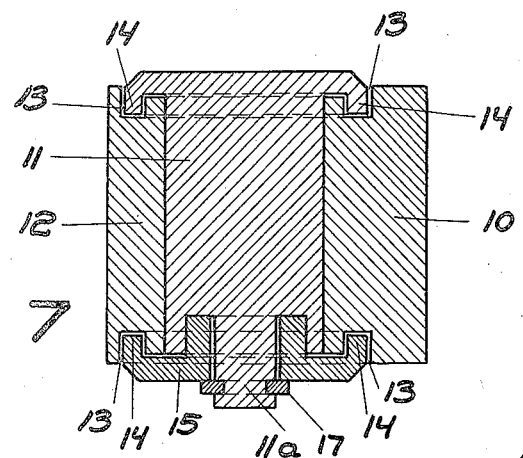

Referring to the drawings, I (Fig. 1) designates a brake cylinder having a braking piston with a piston rod (Figs. 2 to 5) projecting into a gear case 3 adjoining the cylinder I and housing a variable leverage lever 4. One end of the lever 4 is linked to the projecting end of the piston rod 2 by means of a bolt 5. A rod 6 is linked to the other end of the lever 4 by means of a bolt 7 and connects the brake rigging 8 to the lever 4, so that the brake rigging 8 is actuated by the brake piston rod 2 through the variable leverage lever 4. In the case 3 there is provided a guide-way 9 for a displaceable fulcrum support for the lever 4. This fulcrum support comprises a block 10 slidable along the guideway 9 and carrying a bolt 11 which in turn carries a shoe 12 which is rotatable within limits on the bolt 11. Thus, when the lever 4 supports itself against the shoe 12 and is moved by the piston rod 2, the lever 4 turns around the axis of the bolt 11. For holding the bolt 11 and the shoe 12 in place the block 10 and the shoe 12 are provided in their end surfaces with grooves 13 concentric with the axis of the bolt 11 and flanges 14 on the head of the bolt 11 and a retaining washer 15 for the bolt 11 project into the grooves 13, as illustrated in Figs. 6 and 7. The washer 15 is secured on a stud 11a on the bolt 11 by means of a clip 17 or the like.

The variable leverage gear comprising the lever 4 and the displaceable fulcrum support therefor and the case 3 housing this gear form a constructional unit which can be mounted in most existing brake riggings without great changes of the latter. For this purpose it is important that the said constructional unit can be given small overall dimensions. In order to reduce the overall dimensions of the said constructional unit it is necessary to reduce the length of the lever 4. A reduction of the length of the lever 4, however, by necessity results in a greater obliquity of the lever to the axis of the brake cylinder in the position of the lever corresponding to released brake, because of the requirement that the lever at the application of the brake shall attain a position in which the lever, or rather a line drawn through the center of the bolt 5 connecting the lever to the piston rod 2 and the center of the bolt 11 of the fulcrum support for the lever, is substantially perpendicular to the axis of the brake cylinder. The greater the obliquity of the lever to the axis of the brake cylinder is in the released position of the brake, the greater are the movements of the ends of the lever in the lateral directions to the axis of the brake cylinder at application and release of the brake. Great lateral movements of the lever end connected with the brake rigging are disadvantageous because of resulting in correspondingly great lateral movements of the rod connecting the brake rigging to said lever end, and possibly also of parts of the brake rigging itself. Many times no space is available for such great lateral movements, and in any case such movements would complicate the problem of preventing dirt and other foreign matter from entering the casing at the spacious opening then necessary to provide for the rod 6.

According to the invention the disadvantages of making the lever 4 of short length are overcome by the provision of means for guiding the lever 4 connected to the brake piston rod 2 in such a manner that the middle point of the lever is displaced towards the axis of the brake cylinder at the application movement of the brake. This lateral displacement of the middle point of the lever 4 reduces the lateral movement of the end of the lever to which the brake rigging is connected.

In the embodiment of the invention shown on the drawings said guiding means for the lever comprises an arm 18 pivoted in the gear case 3 by means of a pivot pin 19 and linked by means of the bolt 5 to the end of the lever connected to the piston rod 2. The guide-way 9 for the fulcrum support for the lever 4 is substantially perpendicular to the axis of the brake cylinder, and the pivot pin 19 for the arm 18 is disposed in, or in the proximity of, a plane containing the axis of the bolt 11 and perpendicular to the axis of the brake cylinder, so that at applied brake the arm 18 will take a position substantially perpendicular to the axis of the brake cylinder and, in other words, substantially parallel to a line drawn through the centers of the bolts 5 and 11. Thus, at an application of the brake the guiding arm 18 displaces the lever 4 as a whole as the lever 4 is swung from its oblique position by the forward movement of the brake piston, so that at this swinging movement of the lever 4 the middle point thereof is displaced towards the axis of the brake cylinder. When the lever 4 reaches a position substantially perpendicular to the axis of the brake cylinder the displacement of the middle point of the lever 4 towards the axis of the brake cylinder ceases, and in this position of the parts the brake shoes 20 have just reached into contact with the wheels 21 so that the development of the braking pressure begins. Thus it will be seen that the displacement of the middle point of the lever 4 towards the axis of the brake cylinder practically has ceased when the development of the brake pressure begins and that there will be practically no sliding movement of the lever 4 on the supporting shoe 12 under braking pressure.

Dirt and other foreign matter is prevented from entering the casing at the opening 25 for rod 6 by the simple expedient of providing a slidable lid 22 of greater width than the opening and kept in place axially by means of guides 23 whilst movable laterally with the rod which projects through a hole 24 in the lid.

Preferably the lever 4 is given the shape shown on the drawings, according to which the lever has angularly offset end portions for allowing the connecting line between bolts 5 and 7 to reach the center of bolt 11 at the brake application. The adjustment of the displaceable fulcrum support for the lever into the position corresponding to the desired brake applying leverage is performed before the lever 4 is pressed against the fulcrum support at a braking operation. The means for adjusting the position of the displaceable fulcrum support for the lever 4 may be of any known or suitable kind and does not form part of the present invention.

While I have herein shown and described what I now consider to be preferable means for use in the practice of my invention, other means will readily suggest themselves to others skilled in the art, and I do not, therefore desire to limit myself to the construction herein shown and described but desire to extend the protection of my invention to any structure coming within the scope of the appended claims.

What I claim and desire to secure by Letters Patent is:

1. In a variable leverage brake comprising a brake cylinder having a brake piston rod, a variable leverage lever linked at one end to said piston rod, and a brake rigging connected to the other end of said lever, a gear case housing said lever and adjoining the brake cylinder so that the brake piston rod projects into said gear case, a displaceable fulcrum support for said lever in said gear case, a guideway in said gear case for said displaceable fulcrum support, disposed substantially at right angles to the axis of said brake cylinder, and means disposed in said gear case for guiding said lever so as to displace the middle point thereof towards and away from the axis of said brake cylinder at application and release of the brake, respectively.

2. In a variable leverage brake comprising a brake cylinder having a brake piston rod, a variable leverage lever linked at one end to said piston rod, and a brake rigging connected to the other end of said lever, a displaceable fulcrum support for said lever, a guide-way for said displaceable fulcrum support, mounted rigidly in relation to said brake cylinder, substantially at right angles to the axis thereof, and means for guiding said lever so as to displace the middle point thereof towards and away from the axis of the brake cylinder at application and release of the brake, respectively.

3. In a variable leverage brake comprising a brake cylinder having a brake piston rod, a variable leverage lever connected at one end to said piston rod, and a brake rigging connected to the other end of said lever, a displaceable fulcrum support for said lever, a guide-way for said displaceable fulcrum support, mounted rigidly in relation to said brake cylinder substantially at right angles to the axis thereof, and a guiding arm pivoted at a fixed point in the proximity of said guide-way and linked to the end of said lever connected to the brake piston rod, said guiding arm being so arranged as to cause displacement of the middle point of said lever towards and away from the axis of the brake cylinder at application and release of the brake, respectively.

4. A variable leverage gear for vehicle brakes having a brake rigging and a brake cylinder with a brake piston rod for operating the brake rigging, comprising a gear case adapted to be rigidly mounted in relation to the brake cylinder so that the brake piston rod projects into said gear case, a lever disposed in said gear case and adapted to have one of its ends connected to the brake piston rod and to have the brake rigging connected to the other end, a displaceable fulcrum support for said lever in said gear case, a fixed guide-way in said gear case for said displaceable fulcrum support, being substantially parallel to a position of said lever corresponding to applied brake, and a guiding arm for said lever, pivoted in said gear case at a point disposed substantially on a line connecting the ends of said lever when the latter is in said position corresponding to applied brake, the end of said lever to be connected to the brake piston being linked to said arm.

5. A variable leverage gear as claimed in claim 4, in which the length of said guiding arm between its pivot point and the end of the arm connected to the end of said lever to be connected to the brake piston rod is greater than one half of the length of said lever between the ends thereof.

6. A variable leverage gear as claimed in claim 4, in which said lever has angularly offset end portions and in which said displaceable fulcrum support for said lever comprises a block slidable along said guide-way, a bolt carried on said block, and a shoe for said lever to support itself against at braking, rotatable within limits on said bolt.

AXEL GEORG HJALMAR CARLBOM.